(12) United States Patent
Matsumoto et al.

(10) Patent No.: US 11,377,897 B2
(45) Date of Patent: Jul. 5, 2022

(54) COUPLING STRUCTURE OF TOUCH SENSOR

(71) Applicant: NISHIKAWA RUBBER CO., LTD., Hiroshima (JP)

(72) Inventors: Michihiko Matsumoto, Hiroshima (JP); Tomohiro Taguchi, Nagoya (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 424 days.

(21) Appl. No.: 16/681,527

(22) Filed: Nov. 12, 2019

(65) Prior Publication Data

US 2020/0157872 A1     May 21, 2020

(30) Foreign Application Priority Data

Nov. 17, 2018   (JP) .............................. JP2018-216061

(51) Int. Cl.
*E05F 15/70*   (2015.01)
*B60J 5/06*    (2006.01)
*G06F 3/041*   (2006.01)

(52) U.S. Cl.
CPC ................ *E05F 15/70* (2015.01); *B60J 5/06* (2013.01); *G06F 3/041* (2013.01); *E05Y 2900/531* (2013.01); *G06F 2203/04103* (2013.01)

(58) Field of Classification Search
CPC .. E05F 15/70; B60J 5/06; G06F 3/041; G06F 2203/04103; E05Y 2900/531
See application file for complete search history.

(56) References Cited

U.S. PATENT DOCUMENTS

2014/0000165 A1* 1/2014 Patel ...................... E05B 81/77
                                                       292/201
2018/0117997 A1* 5/2018 Otake .................... B60J 5/0468
2018/0348945 A1* 12/2018 Taguchi ............... H03K 17/962

FOREIGN PATENT DOCUMENTS

JP          5476898 B2    2/2014

OTHER PUBLICATIONS

U.S. Appl. No. 16/737,568; First Named Inventor: Michihiko Matsumoto; Title: "Coupling Structure of Touch Sensor"; Filed: Jan. 8, 2020.

* cited by examiner

*Primary Examiner* — Lori L Lyjak
(74) *Attorney, Agent, or Firm* — Holtz, Holtz & Volek PC

(57) ABSTRACT

A part of a touch sensor which couples to a curve of a flange includes an oblique wall and a seal lip. The curve is on a belt line of a sliding door. The oblique wall and the seal lip are close to an interior of an automobile and fit a shape of the curve. A closure wall extends toward an exterior of the automobile and forms a continuous surface with the oblique wall. The closure wall covers a large space from a front side of the automobile.

9 Claims, 14 Drawing Sheets

II — II

V — V

VII – VII

XIV — XIV

US 11,377,897 B2

COUPLING STRUCTURE OF TOUCH SENSOR

CROSS REFERENCE TO RELATED APPLICATION

This application claims the benefit under 35 USC § 119 of JP Patent Application JP 2018-216061 filed Nov. 17, 2018, the entire disclosure of which is incorporated herein by reference.

BACKGROUND INFORMATION

The present invention relates to a coupling structure and a manufacturing method of a touch sensor. When objects including fingers are disposed between an opening of an automobile body and a sliding door on a wagon, a station wagon or the like, a sensor of a touch sensor outputs a corresponding signal for detecting the objects.

A touch sensor 10 couples to a sliding door 1 on a wagon illustrated in FIGS. 12 and 13. The sliding door 1 moves between at least two positions to open and close the opening of the automobile body. The touch sensor 10 extends in an upper and a lower direction of the automobile body and extends toward a front of the automobile body from a front end surface of the sliding door 1.

As illustrated in FIG. 14, the touch sensor 10 includes: an installation base member 11, a hollow part 12, an oblique wall 14, and a seal lip 15. The installation base member 11 couples to a hem flange 40, has a substantially U-shaped cross section including an inner-cabin side wall 11a, an outer-cabin side wall 11b, and a connecting wall 11c. The hollow part 12 is integrally molded with the connecting wall 11c of the installation base member 11. The oblique wall 14 extends toward an exterior of the automobile and slopes rearward from a rear end of the outer-cabin side wall 11b. The seal lip 15 extends toward an interior of the automobile and slopes frontward from a rear end of the oblique wall 14. The seal lip 15 faces and makes elastic contact with an inner-cabin side surface of a front door 2 when the sliding door 1 is in a closed position. A sensor (pressure sensitive sensor) 160 is fixed in the hollow part 12 and outputs a corresponding electric signal upon detecting the objects such as a part of human bodies (fingers, hands or legs) between the sliding door 1 and the opening of the automobile body.

The installation base member 11 has a plurality of anchoring parts 16 formed on an inner side and a core 17 embedded in the installation base member 11. The anchoring parts 16 extend toward the inner side and hold the hem flange 40 by making elastic contact. The core 17 has a substantially U-shaped cross section and increases rigidity of the installation base member 11.

As illustrated in FIG. 13, the flange 40 has a substantially S shape in accordance with a shape of the sliding door 1 on a belt line 30. More specifically, the flange 40 has a curve 1c on the belt line 30. The curve 1c extends in the upper and lower direction and has a convex shape toward the interior of the automobile.

The touch sensor 10 is formed by extrusion molding. When fixing the touch sensor 10 on the sliding door 1, the touch sensor 10 does not follow the curve 1c systematically. In other words, the touch sensor 10 is pressed toward the exterior of the automobile and shifts toward the exterior of the automobile. Accordingly, the flange 40 applies force on the part of the touch sensor 10 on the belt line 30 to approach the interior of the automobile.

In this connection, preventive measures against the force which acts on the touch sensor 10 toward the interior of the automobile include: crushing the installation base member 11 on the part of the touch sensor 10 on the curve 1c; and adhering a rubber plate on the inner side of the installation base member 11 on the curve 1c. With these configurations, the installation base member 11 is partially increased in strength to hold the flange 40.

Unfortunately, however, crushing the installation base member 11 and adhering the rubber plate increases number of processes and complicates operations. Especially, crushing the installation base member 11 is hard to adjust strength for crushing and keep strength stable. Also, adhering the rubber plate causes adhesive to flow down while adhering the rubber plate to the installation base member 11 and the rubber plate is hard to arrange on a fixed position.

Also, in case the flange 40 on the curve 1c is extremely small in a degree of curve (radius of curvature) seen from a front direction of the automobile, a belt weather strip which couples to the belt line 30 approaches the flange 40. Accordingly, the touch sensor 10, which couples to the sliding door 1, is required to keep away from a rear end of the belt weather strip on the front door 2 when the front door 2 is in a closed position.

Some sliding doors 1 have a space among a lower end on a front end of a belt line weather strip 20, a door inner panel 1a, and a door outer panel 1b, and the space is exposed on a front end of the belt line 30. The belt line weather strip 20 couples to the belt line 30. The sliding doors 1 require an improved appearance with the space filled up.

In this connection, Japanese Patent No. 5476898 discloses a configuration that a covering member covers a space between the inner panel and the outer panel of the sliding door and the covering member has a connection flange which connects an upper flange and a lower flange with the covering member.

Unfortunately, however, the covering member of Japanese Patent No. 5476898 is fixed on the body by bolts and requires a lot of time for operation.

In addition, while the connection flange forms a continuous flange in the upper and lower direction by connecting the upper flange and the lower flange, the connection flange has a convex shape toward an exterior of the automobile. Accordingly, the connection flange is hard to follow for the touch sensor (seal member) which couples to the connection flange.

Therefore, an object of the present invention is to provide the coupling structure and the manufacturing method of the touch sensor which couples to the curve on the flange systematically and stably.

SUMMARY

In order to achieve the above-mentioned object, according to one aspect of the invention, a coupling structure of a touch sensor is provided. The coupling structure includes a sliding door (1), a flange (40), and the touch sensor (50).

The sliding door (1) moves between at least two positions to open and close an opening of an automobile body. The sliding door (1) has a large space (100) among a lower end of a belt line weather strip (20), an inner panel (1a), and an outer panel (1b), and the space (100) is exposed on a front end of a belt line (30). The belt line weather strip (20) couples to the belt line (30).

The flange (40) is formed on a front edge of the sliding door (1). The flange (40) extends in an upper and lower direction of the automobile body and has a curve (1c) on the belt line (30). The curve (1c) extends in the upper and lower direction and has a convex shape toward an interior of the automobile.

The touch sensor (50) couples to the flange (40). The touch sensor (50) includes an installation base member (51), a hollow part (52), a sensor (160), and an oblique wall (54, 64).

The installation base member (51) has a substantially U-shaped cross section including an inner-cabin side wall (51a), an outer-cabin side wall (51b), and a connecting wall (51c). The connecting wall (51c) connects the side walls (51a, 51b). The installation base member (51) has a plurality of anchoring parts (56) formed on an inner side. The anchoring parts (56) extend toward the inner side.

The hollow part (52) is unified with the connecting wall (51c). The hollow part (52) makes elastic contact with an object disposed between the sliding door (1) and the opening of the automobile body.

The sensor (160) is fixed in the hollow part (52). When the object makes contact with the hollow part (52), the sensor (160) outputs corresponding electric signal.

The oblique wall (54, 64) extends toward an exterior of the automobile and slopes rearward from a rear end of the outer-cabin side wall (51b).

On a part of the touch sensor (50), which couples to the curve (1c) of the flange (40), the touch sensor (50) includes the oblique wall (64). The oblique wall (64) is close to the interior of the automobile and fits a shape of the curve (1c). A closure wall (70) extends toward the exterior of the automobile and forms a continuous surface with the oblique wall (64). The closure wall (70) covers the large space (100) from a front side of the automobile.

In addition, according to an aspect of the present invention, the touch sensor (50) includes a seal lip (55, 65). The seal lip (55, 65) extends toward an interior of the automobile and slopes frontward from a rear end of the oblique wall (54, 64). The seal lip (55, 65) faces and makes elastic contact with a circumferential edge of the opening of the automobile body when the sliding door (1) is in a closed position.

On the part of the touch sensor (50), which couples to the curve (1c) of the flange (40), the seal lip (65) of the touch sensor (50) is close to the interior of the automobile and follows the curve (1c).

In addition, according to an aspect of the present invention, on the part of the touch sensor (50), which couples to the curve (1c) of the flange (40), a base root of the seal lip (65) relative to the oblique wall (64) gradually approaches the outer-cabin side wall (51b) from a rear end of the oblique wall (64) in a range from an upper part of the curve (1c) to an apex (130), and the base root of the seal lip (65) gradually approaches the rear end of the oblique wall (64) from the outer-cabin side wall (51b) in a range from the apex (130) of the curve (1c) to a lower part.

In addition, according to an aspect of the present invention, on the part of the touch sensor (50), which couples to the curve (1c) of the flange (40), the touch sensor (50) includes a protrusion (80). The protrusion (80) extends rearward from a rear surface of the oblique wall (64). The protrusion (80) makes contact with an inner-cabin side surface of reinforcement (3) and receive reaction force from the reinforcement (3). The reinforcement (3) is closer to an exterior of the automobile than the inner panel (1a).

In addition, according to an aspect of the present invention, on the part of the touch sensor (50), which couples to the curve (1c) of the flange (40), the oblique wall (64) has a first insert (91) embedded in the oblique wall (64). The first insert (91) has a shape of a plate and is made of resin.

In addition, according to an aspect of the present invention, on the part of the touch sensor (50), which couples to the curve (1c) of the flange (40), the oblique wall (64) has the first insert (91), which has the shape of the plate and is made of resin, embedded in the oblique wall (64), and the protrusion (80) has a second insert (92) embedded in the protrusion (80). The second insert (92) has a shape of a bar and is made of resin. The second insert (92) extends rearward from a rear surface of the first insert (91) and is unified with the first insert (91).

In addition, according to an aspect of the present invention, the part of the touch sensor (50), which couples to the curve (1c) of the flange (40), includes: the oblique wall (64), the seal lip (65), and the closure wall (70), which are formed by die molding; and members other than the oblique wall (64), the seal lip (65), and the closure wall (70), which are formed by extrusion molding.

In addition, according to an aspect of the present invention, the part of the touch sensor (50), which couples to the curve (1c) of the flange (40), includes: the rear end of the outer-cabin side wall (51b), the oblique wall (64), the seal lip (65), and the closure wall (70), which are formed by die molding; and members other than the rear end of the outer-cabin side wall (51b), the oblique wall (64), the seal lip (65), and the closure wall (70), which are formed by extrusion molding.

In addition, according to an aspect of the present invention, the protrusion (80) is formed by die molding.

In addition, according to one aspect of the invention, a manufacturing method of a touch sensor is provided. The manufacturing method employs a sliding door (1), a flange (40), and the touch sensor (50).

The sliding door (1) moves between at least two positions to open and close an opening of the automobile body. The sliding door (1) has a large space (100) among a lower end of a belt line weather strip (20), an inner panel (1a), and an outer panel (1b), and the space (100) is exposed on a front end of a belt line (30). The belt line weather strip (20) couples to the belt line (30).

The flange (40) is formed on a front edge of the sliding door (1). The flange (40) extends in an upper and lower direction of the automobile body and has a curve (1c) on the belt line (30). The curve (1c) extends in an upper and lower direction and has a convex shape toward an interior of the automobile.

The touch sensor (50) couples to the flange (40). The touch sensor (50) includes an installation base member (51), a hollow part (52), a sensor (160), an oblique wall (54, 64), and a seal lip (55, 65).

The installation base member (51) has a substantially U-shaped cross section including an inner-cabin side wall (51a), an outer-cabin side wall (51b), and a connecting wall (51c). The connecting wall (51c) connects the side walls (51a, 51b). The installation base member (51) has a plurality of anchoring parts (56) formed on an inner side. The anchoring parts (56) extend toward the inner side.

The hollow part (52) is unified with the connecting wall (51c). The hollow part (52) makes elastic contact with an object disposed between the sliding door (1) and the opening of the automobile body.

The sensor (160) is fixed in the hollow part (52). When the object makes contact with the hollow part (52), the sensor (160) outputs corresponding electric signal.

The oblique wall (54, 64) extends toward an exterior of the automobile and slopes rearward from a rear end of the outer-cabin side wall (51b).

The seal lip (55, 65) extends toward an interior of the automobile and slopes frontward from a rear end of the oblique wall (54, 64). The seal lip (55, 65) faces and makes elastic contact with a circumferential edge of the opening of the automobile body when the sliding door (1) is in a closed position.

The method includes: forming the touch sensor (50) by extrusion molding;

on a part of the touch sensor (50), which couples to the curve (1c) of the flange (40), cutting out the oblique wall (54) and the seal lip (55), which are formed by extrusion molding, and substituting the oblique wall (64) and the seal lip (65), which are formed by die molding. The oblique wall (64) and the seal lip (65) fit a shape of the curve (1c), and forming a closure wall (70) which extends toward the exterior of the automobile. The closure wall (70) forms a continuous surface with the oblique wall (64). The closure wall (70) covers the large space (100) from a front side of the automobile.

In addition, according to an aspect of the present invention, a protrusion (80) is formed during the die molding. The protrusion (80) extends rearward from a rear surface of the oblique wall (64). The protrusion (80) makes contact with an inner-cabin side surface of reinforcement (3) and receive reaction force from the reinforcement (3). The reinforcement (3) is closer to the exterior of the automobile than the inner panel (1a).

Symbols in parentheses show constituents or items corresponding to the drawings.

According to the present invention, on the part of the touch sensor which couple to the curve of the flange on the sliding door, the touch sensor includes the oblique wall. The curve of the flange is on the front end of the belt line. The oblique wall is close to the interior of the automobile and fits the shape of the curve. With this configuration, the touch sensor systematically follows the curve. In other words, the touch sensor is not subjected to force from the flange to approach the interior of the automobile even without crushing a part of the installation base member or adhering an extra rubber plate or the like on the installation base member as in the prior art.

The touch sensor is simply manufactured by cutting out the oblique wall formed by extrusion molding and substituting the oblique wall formed by die molding for the oblique wall.

Also, the closure wall is formed on the oblique wall and covers the large space exposed on the front end of the belt line from the front side of the automobile. This configuration does not degrade the appearance.

The hollow part with the sensor fixed curves along the curve without an extra process including cutout. This configuration does not degrade a function of the sensor.

In addition, a parting portion between the rear end of the front door and the front end of the rear door can be sealed. This configuration of the touch sensor is simply manufactured by, in case the touch sensor formed by extrusion molding includes the seal lip, cutting out the seal lip formed by extrusion molding and substituting the seal lip formed by die molding.

In addition, on the part of the touch sensor which couples to the curve of the flange, the base root of the seal lip relative to the oblique wall gradually approaches the outer-cabin side wall from the rear end of the oblique wall in the range from the upper part of the curve to the apex, and the base root of the seal lip gradually approaches the rear end of the oblique wall from the outer-cabin side wall in the range from the apex of the curve to the lower part. With this configuration, the touch sensor is excellent in appearance and the oblique wall is visible. Also, the touch sensor does not touch the rear end of the belt weather strip on the front door when the front door is in a closed position.

In addition, the touch sensor includes the protrusion which extends rearward direction from the rear surface of the oblique wall. The protrusion makes contact with the inner-cabin side surface of the reinforcement and receives the reaction force from the reinforcement. The reinforcement is closer to the exterior of the automobile than the inner panel. Accordingly, the touch sensor as a whole is subjected to force from the base root of the protrusion to approach the outer-cabin side, and is kept away from the force from the flange to approach the interior of the automobile. In addition, this configuration enables close adherence of the closure wall to the space and prevents the closure wall from rising.

Also, the closure wall and the oblique wall, on which the base root of the protrusion is fixed, form the continuous flat surface. Accordingly, as the force is applied on the closure wall toward a rear side from a front side, the oblique wall is also pressed toward the rear side from the front side, and the force is directly transmitted to the protrusion.

In addition, on the part of the touch sensor which couples to the curve of the flange, the oblique wall has the first insert which has the shape of the plate and is made of resin embedded in the oblique wall. This configuration improves rigidity and heat resistance.

In addition, the protrusion has the second insert embedded in the protrusion. The second insert has the shape of the bar and is made of resin. The second insert extends rearward from the rear surface of the first insert and is unified with the first the insert. This configuration improves rigidity of the protrusion.

In addition, the present invention does not degrade precision in detection of the sensor fixed in the hollow part of the touch sensor.

In addition, the rear end of the outer-cabin side wall, the oblique wall, the seal lip, the closure wall, and the protrusion of the touch sensor are formed by die molding, and the members other than the rear end of the outer-cabin side wall, the oblique wall, the seal lip, the closure wall, and the protrusion are formed by extrusion molding. As a part of a core embedded in a part formed by extrusion molding is removed, flexibility of the touch sensor improves such that the touch sensor is improved in followability along a curvature radius of the automobile body even in case the curve is small in the curvature radius. Also, this configuration increases an area of close adherence between the part formed by extrusion molding and a part formed by die molding, and therefore the touch sensor is improved in strength in close adherence between the part formed by extrusion molding and the part formed by die molding.

DETAILED DESCRIPTION

Figure 1:
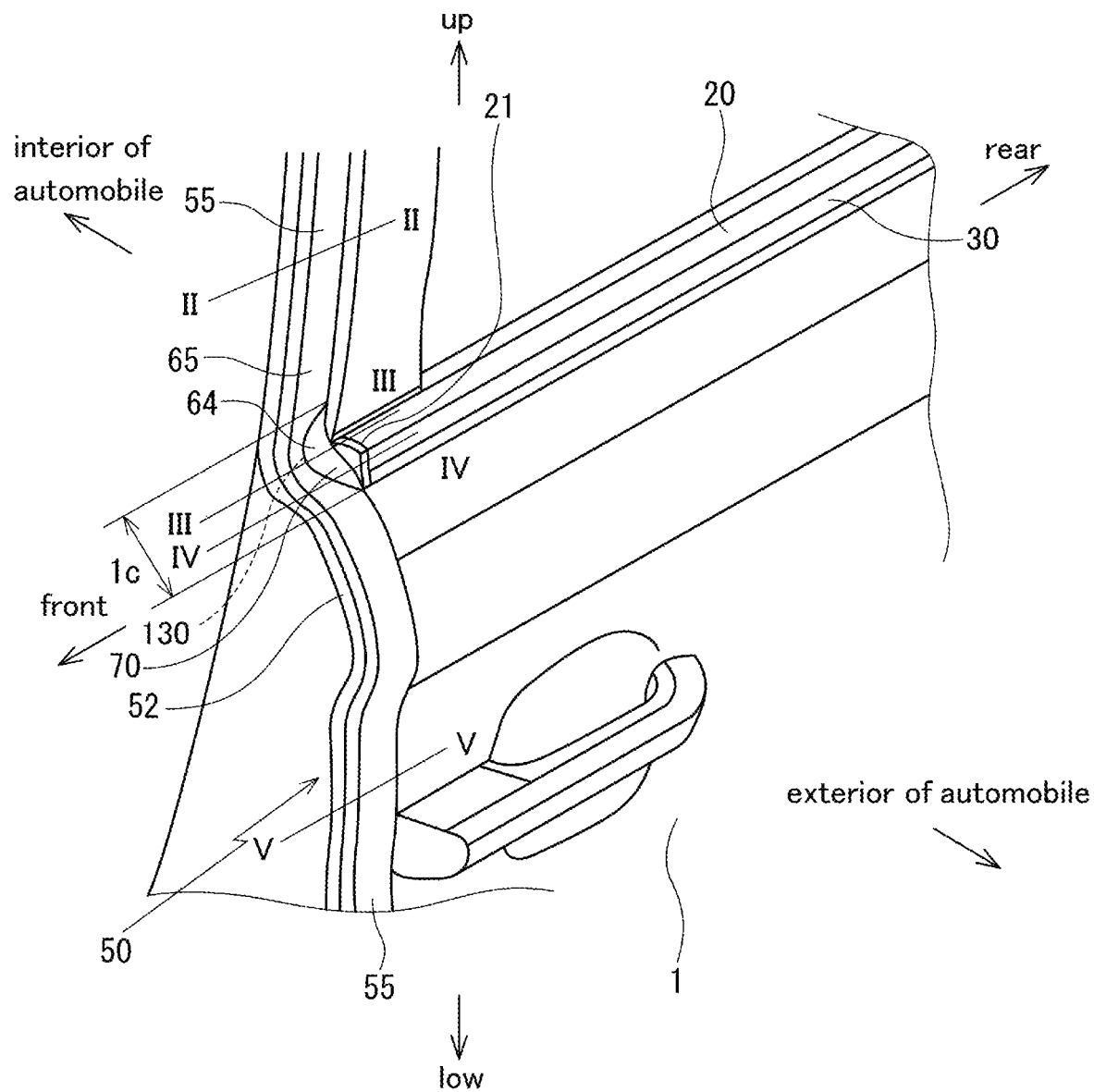
FIG. 1 is a perspective view of a touch sensor according to an embodiment of the invention coupling to a sliding door.

Referring to the Drawings, a coupling structure and a manufacturing method of a touch sensor will be described.

As illustrated in FIG. 1 to FIG. 5, a touch sensor 50 according to an embodiment of the present invention couples to a flange 40 on a front end of a sliding door 1. The sliding door 1 moves between at least two positions to open and close an opening of an automobile body. The touch sensor 50 protrudes toward a front side of the automobile body from the flange 40. It is to be noted that words "a front and a rear" indicate a front and rear direction of the automobile body. In the embodiment, a part closer to a hollow part 52 of the touch sensor 50 is a front side of the automobile body, and a part closer to an installation base member 51 is a rear side of the automobile body.

Figure 6:
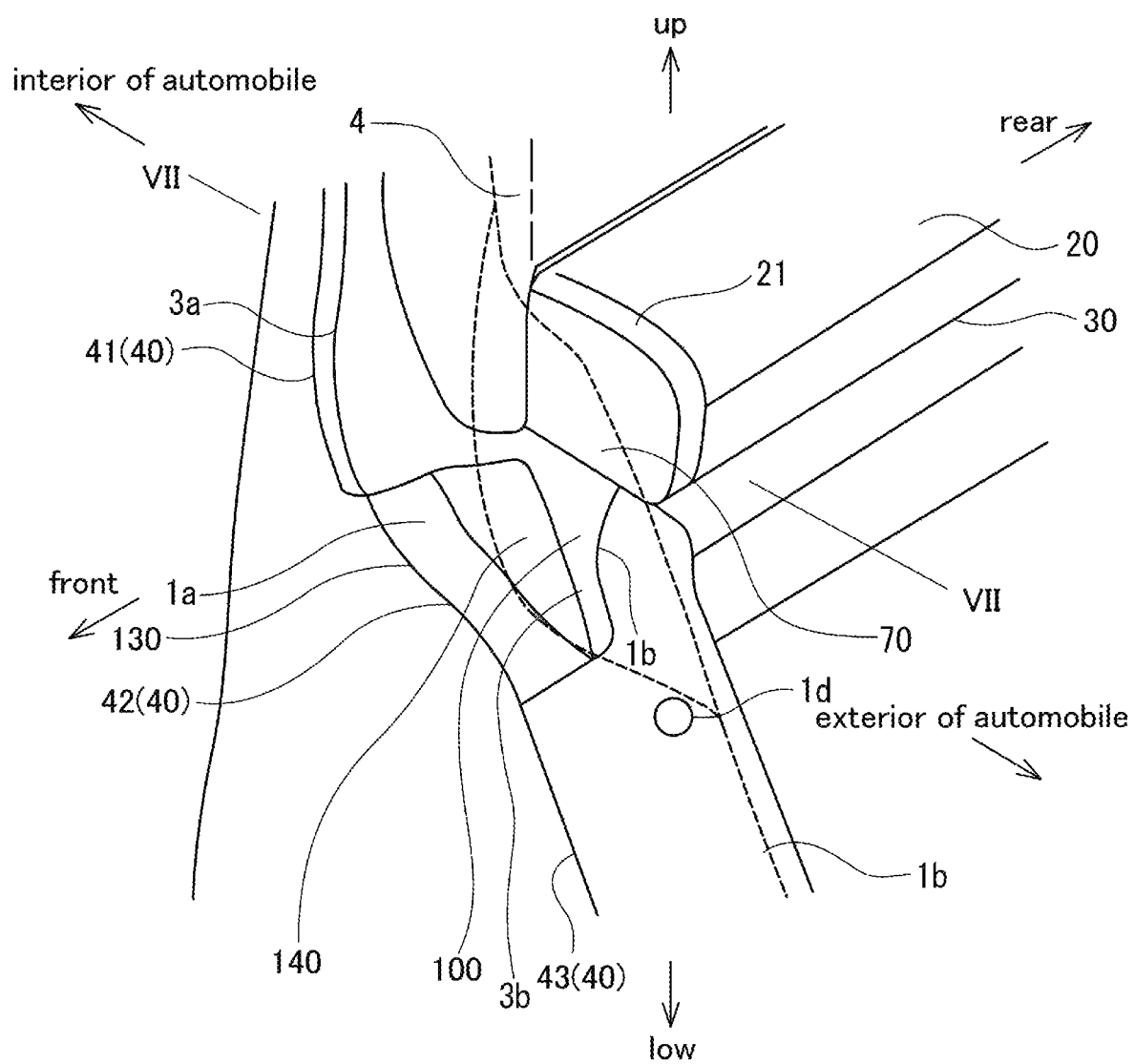
FIG. 6 is a perspective view of a curve on a flange on the sliding door.
Figure 7:
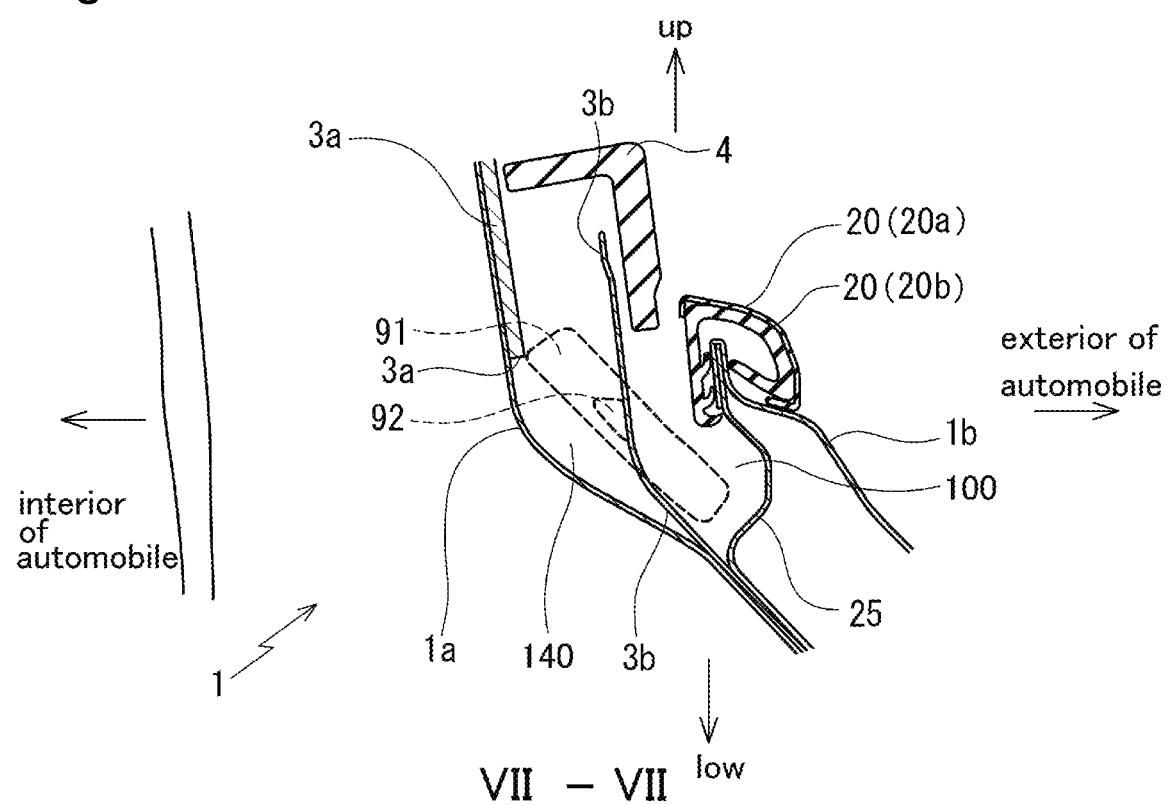
FIG. 7 is an enlarged cross-sectional view taken along line VII-VII of FIG. 6.

As illustrated in FIG. 1, the flange 40 extends in an upper and lower direction of the automobile body and has a curve 1*c* on the belt line 30. The curve 1*c* extends in the upper and lower direction and has a convex shape toward an interior of the automobile. In addition, as illustrated in FIG. 6 and FIG. 7, a belt line weather strip 20 (20*a* is made of metal, 20*b* is made of resin without a lip) is horizontal with the belt line 30 and couples to the belt line 30. The sliding door 1 has a large space 100 among a lower end of the belt line weather strip 20, and a door inner panel 1*a* and a door outer panel 1*b* of the sliding door 1. Since the large space 100 is exposed on a front end of the belt line 30, absence of a cover or the like keeps the large space 100 visible from a front side of the automobile.

Figure 10:
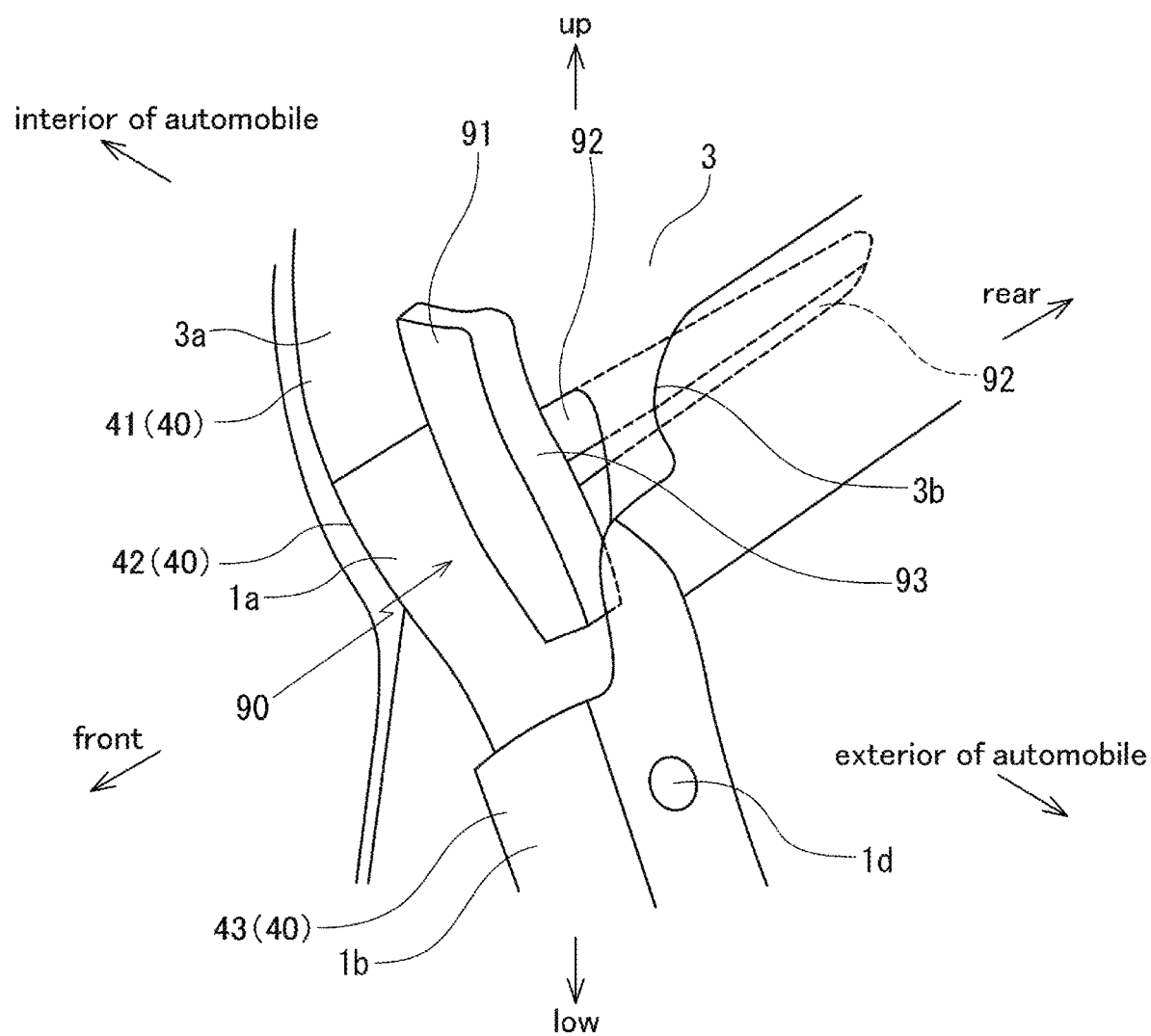
FIG. 10 is a perspective view of the touch sensor according to the embodiment of the invention illustrating a position of an insert which is made of resin and embedded in the touch sensor in relation to a position of the sliding door.

In addition, as illustrated in FIG. 10, reinforcement 3 extends toward a lower side of the belt line 30 from an upper side. The reinforcement 3 is closer to the exterior of the automobile than the inner panel 1*a*. An upper end of the outer panel 1*b* is horizontal with the belt line 30, and the belt line weather strip 20 couples to the upper end of the outer panel 1*b*. In addition, as illustrated in FIG. 7, a decorative garnish 4 couples to the reinforcement 3 on an upper side in relation to the belt line weather strip 20.

The sliding door 1 includes the inner panel 1*a* and the outer panel 1*b*. The inner panel 1*a* is a singular sheet metal. The outer panel 1*b* is divided into two separate panels on the belt line 30. The garnish 4 on the reinforcement 3 improves appearance of the automobile.

Figure 2:
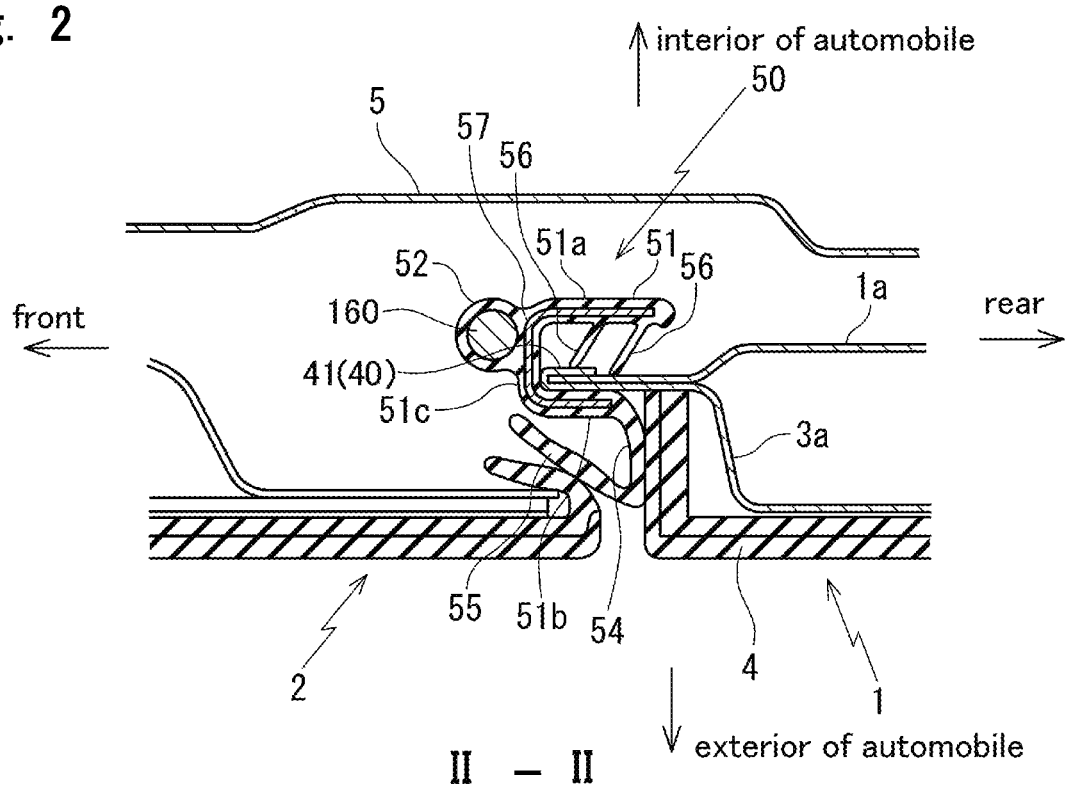
FIG. 2 is an enlarged cross-sectional view taken along line II-II of FIG. 1.

In addition, as illustrated in FIG. 2, a sensor (pressure sensitive sensor) 160 fixed in the follow part 52 of the touch sensor 50 outputs a corresponding electric signal upon detecting an object such as a part of human bodies (fingers, hands or legs) between the sliding door 1 and the opening of the automobile body, a rear end of a front door 2 in the present embodiment.

Figure 14:
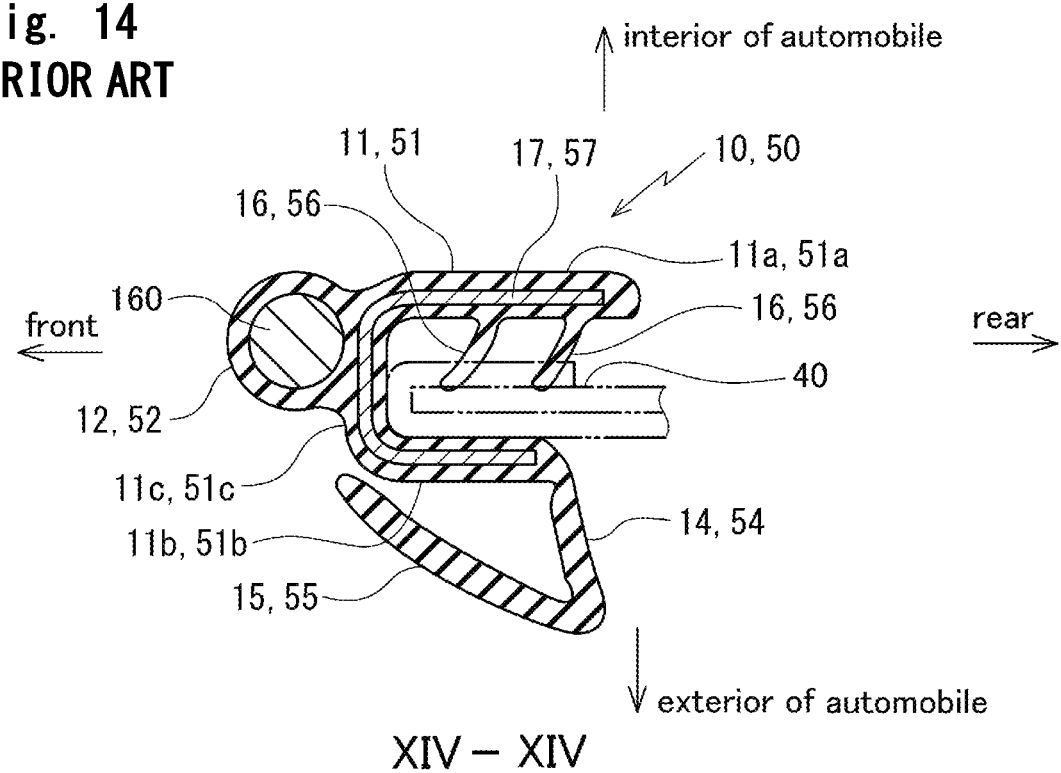
FIG. 14 is a perspective view of the touch sensor according to the prior art coupling to the sliding door taken along line XIV-XIV of FIG. 13.

The touch sensor 50 is formed by extrusion molding. The touch sensor 50 includes an installation base member 51, a hollow part 52, a oblique wall 54, and a seal lip 55 in the same manner as FIG. 14, except for a part which couples to the curve 1*c* of the flange 40, in other words, on an upper side and a lower side relative to the curve 1*c*. The installation base member 51 directly couples to a hem flange 40, has a substantially U-shaped cross section including an inner-cabin side wall 51*a*, an outer-cabin side wall 51*b*, and a connecting wall 51*c*. The connecting wall 51*c* connects the side walls 51*a*, 51*b*. The hollow part 52 is integrally molded with the connecting wall 51*c* of the installation base member 51. The oblique wall 54 extends toward an exterior of the automobile and slopes rearward from a rear end of the outer-cabin side wall 51*b*. The seal lip 55 extends toward an interior of the automobile and slopes frontward direction from a rear end of the oblique wall 54. The seal lip 55 faces and makes elastic contact with a circumferential edge of a door opening of the automobile body when the sliding door 1 is in a closed position. The installation base member 51 has a plurality of anchoring parts 56 formed on an inner side and a core 57 embedded in the installation base member 51. The anchoring parts 56 extend toward the inner side and hold the hem flange 40 by making elastic contact. The core 57 has a substantially U-shaped cross section and increases rigidity of the installation base member 51. The sensor 160 is fixed in the hollow part 52. The flange 40, to which the installation base member 51 of the touch sensor 50 couples, is a hem flange 41 (FIG. 2, FIG. 3) on an upper side relative to the belt line 30 as illustrated in FIG. 6. The hem flange 41 is formed by covering an end of the inner panel 1*a* with a flange-forming part 3*a* of the reinforcement 3. The flange 40 on the belt line 30 is a flange 42 (FIG. 4), and the flange 40 on the lower side relative to the belt line 30 is a hem flange 43 (FIG. 5). The flange 42 includes only the end of the inner panel 1*a*. The hem flange 43 is formed by covering the end of the inner panel 1*a* with the outer panel 1*b*.

The hollow part 52 makes elastic contact with the object disposed between the sliding door 1 and the rear end of the front door 2 when the sliding door 1 is moved towards a closed position. The sensor 160 in the hollow part 52 outputs a corresponding electric signal upon detecting the object between the sliding door 1 and the rear end of the front door 2.

The sensor 160 has two core wires (electrode wires) embedded in two rubber like elastic bodies (conductive parts) which have conductivity. In addition, the rubber like elastic bodies have a space between the rubber like elastic bodies. The two core wires extend in the upper and lower direction (longitudinal direction) and are fixed in the hollow part 52. As the object is disposed between the sliding door 1 and the rear end of the front door 2 when the sliding door 1 is moved towards the closed position, the object makes contact with a part of the hollow part 52, and then the two rubber like elastic bodies contact with each other and the two core wires short. Resultant change in electric signal is transmitted to a control unit joined with leads which are connected with the two core wires in a lower side terminal part of the touch sensor 50, and as a result, the object is detected.

A configuration of the sensor 160 is not limited as long as the sensor 160 is fixed in the hollow part 52 and detects the objects.

Figure 8:
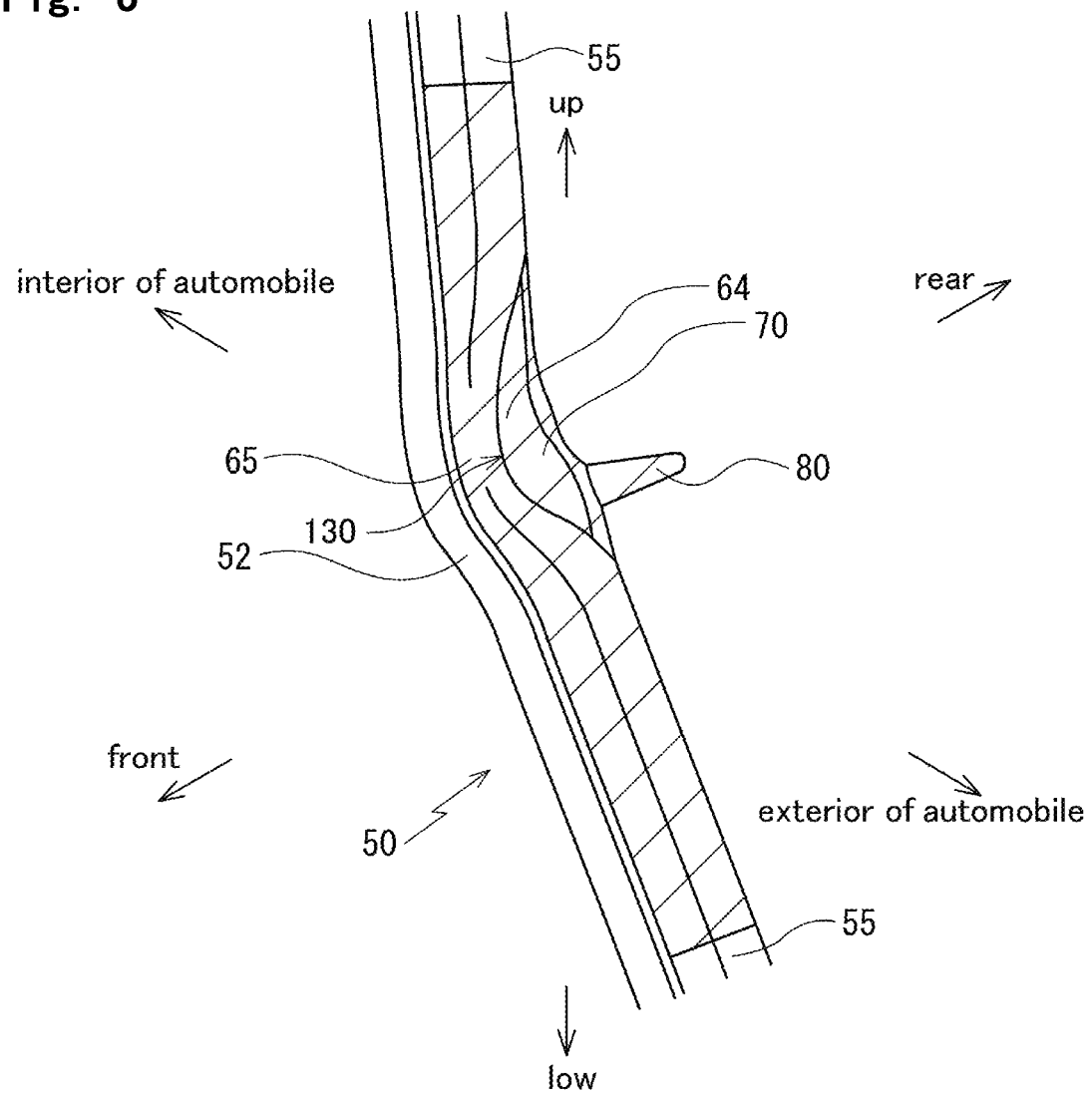
FIG. 8 is a perspective view of an important part of the touch sensor according to the embodiment of the invention seen from a front side of an automobile.

As illustrated in FIG. 1 and FIG. 8, on the part of the touch sensor 50, which couple to the curve 1*c* of the flange 40, an oblique wall 64 and a seal lip 65 are close to the interior of the automobile and fit a shape of the curve 1*c*. The oblique wall 64 and the seal lip 65 are formed by die molding.

In the present embodiment, the oblique wall 64 and the seal lip 65 substitute for the members cut out from the touch sensor 50 formed by extrusion molding. In FIG. 8, shaded portions indicate the members formed by die molding.

Figure 3:
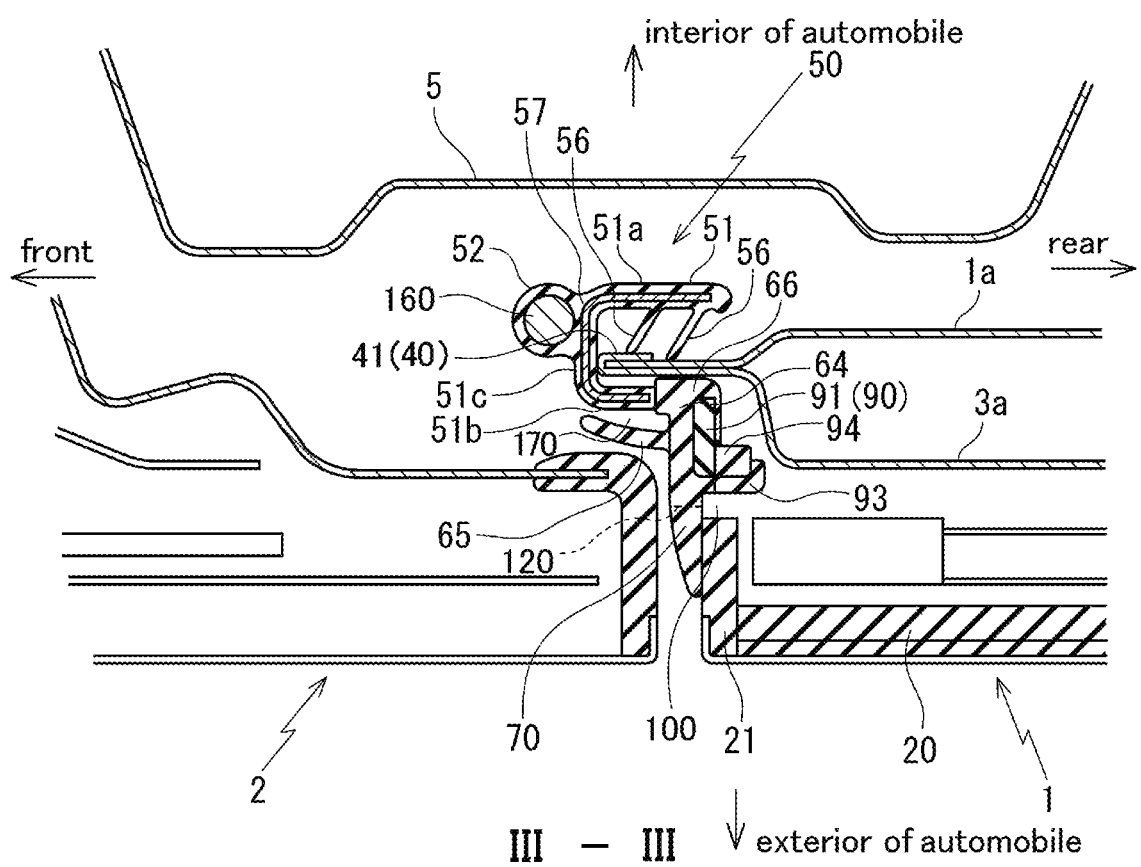
FIG. 3 is an enlarged cross-sectional view taken along line III-III of FIG. 1.

More specifically, the oblique wall 64 and the seal lip 65 illustrated in FIG. 3 are formed by: cutting out the rear end of the outer-cabin side wall 51*b* of the installation base member 51, the oblique wall 54, and the seal lip 55, which are formed by extrusion molding; arranging remaining parts of the touch sensor 50 on a die (not illustrated) along the curve 1*c*; and injecting material for die molding into a cavity of the die to form the parts by die molding while applying kink by heating. The oblique wall 64 and the seal lip 65 are formed by die molding between the upper part and the lower part of the curve 1*c* of the flange 40. Examples of the material for die molding include synthetic rubber such as EPDM, but are not specifically limited.

With this configuration, the oblique wall 64 formed by die molding is continuous and integral with the oblique wall 54 formed by extrusion molding on the upper side and the lower side relative to the oblique wall 64. In the same manner, the seal lip 65 formed by die molding is continuous and integral with the seal lip 55 formed by extrusion molding on the upper side and the lower side relative to the seal lip 65.

The inner-cabin side wall 51*a* and the connecting wall 51*c* of the installation base member 51 as well as the hollow part 52 are not subjected to an extra process of cutting-out and the sensor 160 in the hollow part 52 is not subjected to a harmful effect.

A position of a base root of the seal lip 65 in relation to a position of the oblique wall 64 is curvilinear as illustrated in FIG. 1 and FIG. 8. More specifically, on a surface (front side surface) of the oblique wall 64, the base root of the seal lip 65 gradually approaches the outer-cabin side wall 51*b* (see FIG. 3 and FIG. 8) from the rear end of the oblique wall 64 in a range from the upper part of the curve 1*c* to an apex 130. Also, the base root of the seal lip 65 gradually approaches the rear end of the oblique wall 64 from the outer-cabin side wall 51*b* in a range from the apex 130 of the curve 1*c* to a lower part.

With this configuration, the seal lip 65 does not cover the surface (front side surface) of the oblique wall 64 completely and the surface is partially exposed.

Figure 4:
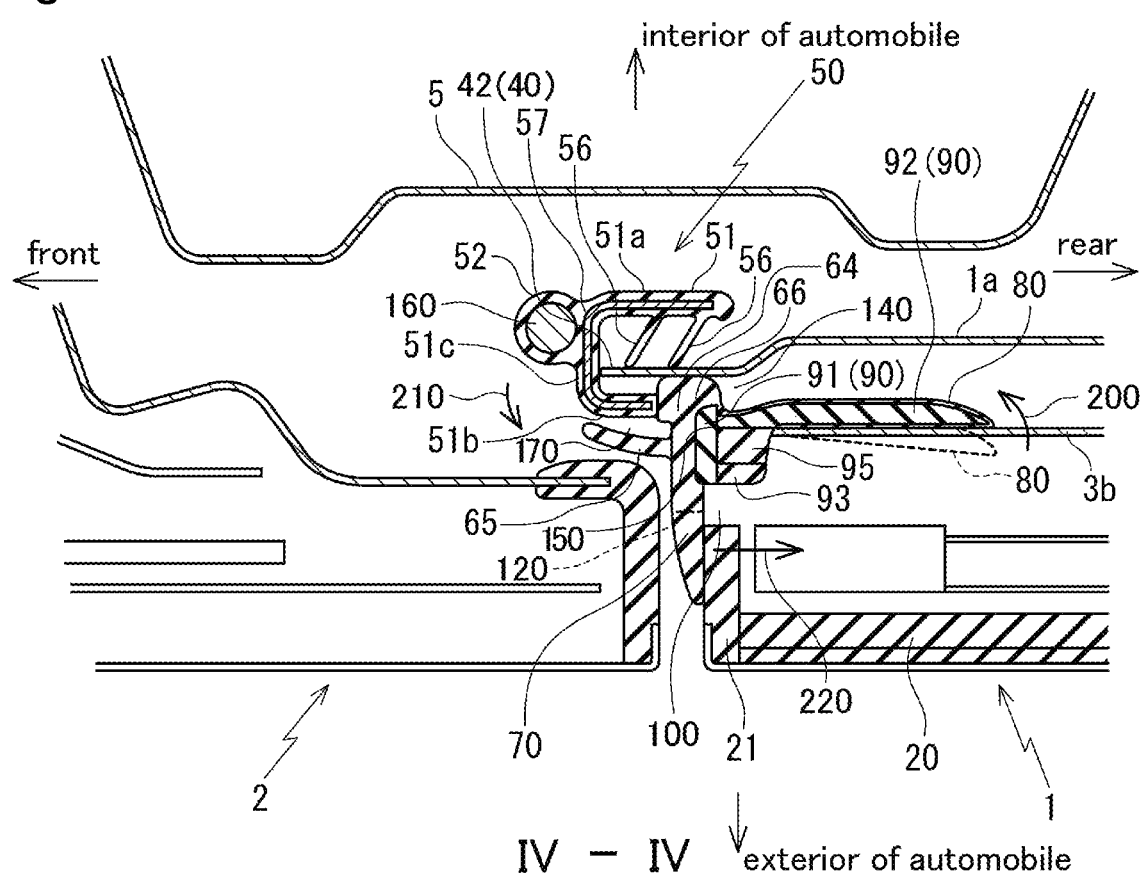
FIG. 4 is an enlarged cross-sectional view taken along line IV-IV of FIG. 1.
Figure 5:
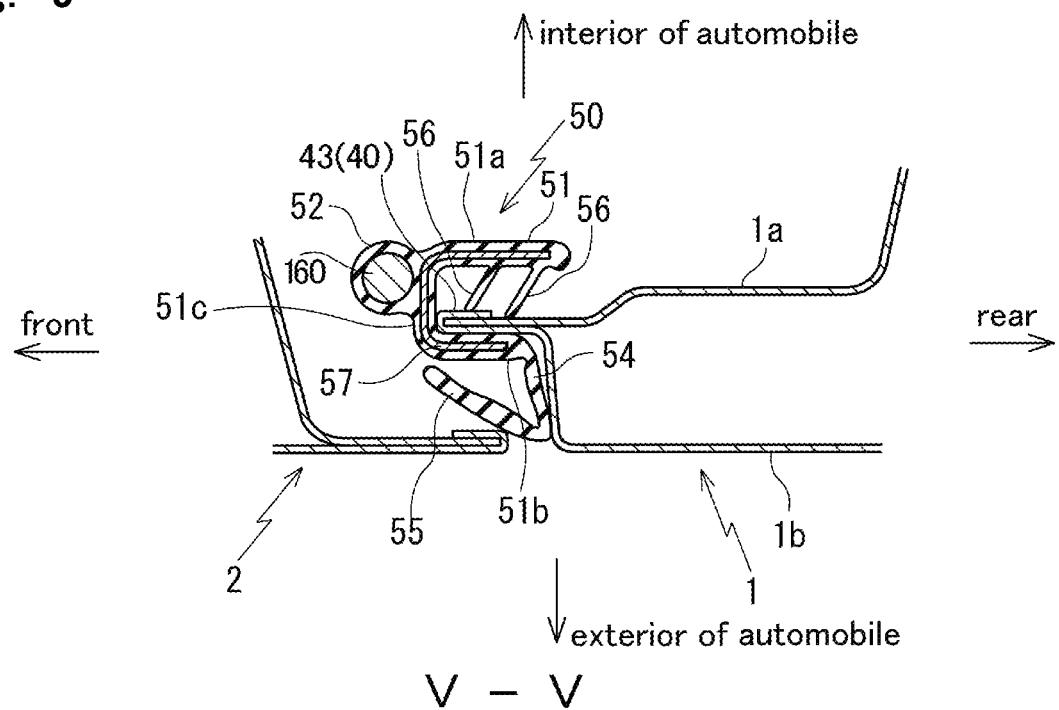
FIG. 5 is an enlarged cross-sectional view taken along line V-V of FIG. 1.
Figure 9:
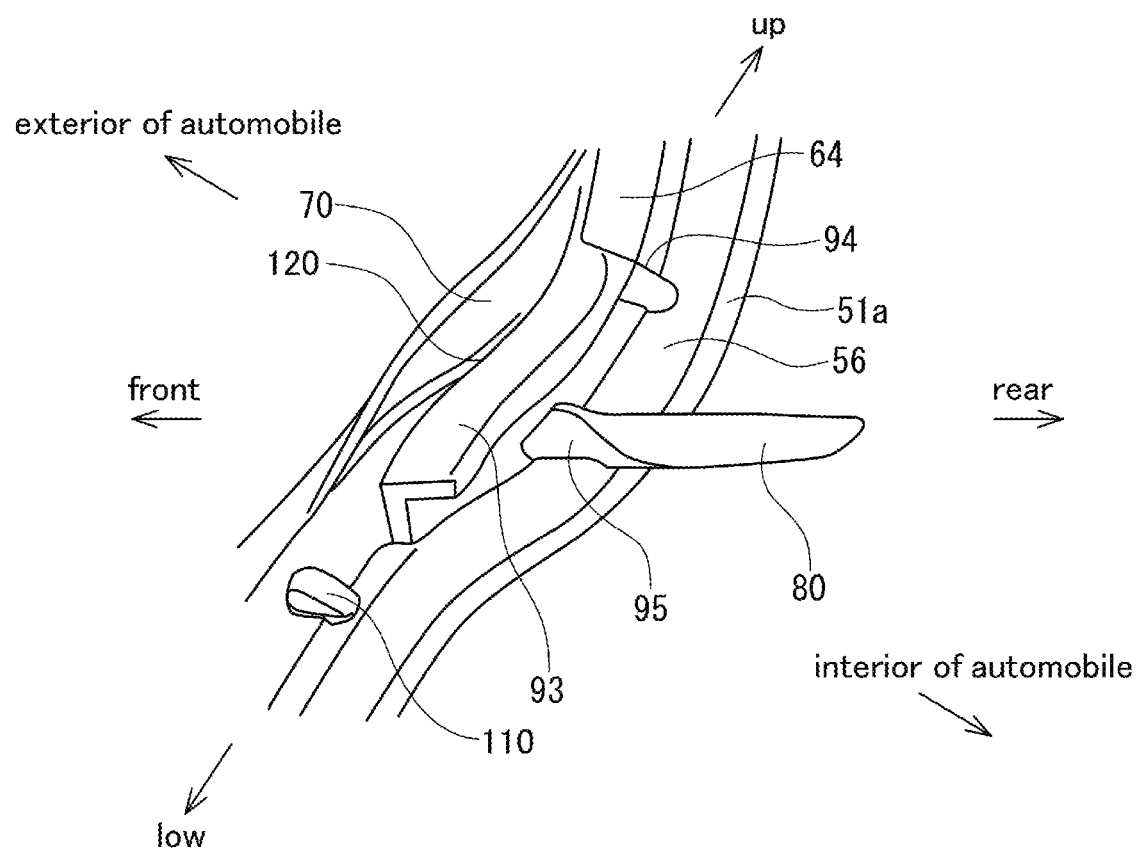
FIG. 9 is a perspective view of the important part of the touch sensor according to the embodiment of the invention seen from a rear side of the automobile.

In addition, a closure wall 70 and a protrusion 80, illustrated in FIGS. 4, 8, 9, are formed integrally and simultaneously with the oblique wall 64 and the seal lip 65 while the oblique wall 64 and the seal lip 65 are being die molded.

As illustrated in FIG. 3 and FIG. 4, the closure wall 70 has the shape of a plate, forms a continuous surface with the oblique wall 64, extends toward the exterior of the automobile, and covers the large space 100 from the front side of the automobile. Accordingly, the closure wall 70 has a size (area) larger than an area of an opening of the large space 100. A visible borderline 120, illustrated in FIG. 9, between the closure wall 70 and the seal lip 65 is not visible at a front surface illustrated in FIG. 8.

FIG. 3 and FIG. 4 illustrate the borderline 120 between the closure wall 70 and the oblique wall 64 with a broken line.

Another possible embodiment is that the outer-cabin side wall 51*b* and the seal lip 65 are unified by injecting die-molding material into a small space 170, illustrated in FIG. 3 and FIG. 4, to prevent the seal lip 65 from shifting toward the exterior of the automobile when coupled to the flange 40. The small space 170 is between an outer-cabin side surface of the outer-cabin side wall 51*b* and an inner-cabin side surface of the seal lip 65 around the apex 130 of the curve 1*c*.

As illustrated in FIG. 4 and FIG. 9, the protrusion 80 has a shape of a bar and extends rearward from the rear surface close to the interior of the automobile of the oblique wall 64. As illustrated in FIG. 4, an outer-cabin side surface of the protrusion 80 makes contact with an inner-cabin side surface of a front part/lower end protrusion 3*b* of reinforcement 3 and receives a reaction force from the front part/lower end protrusion 3*b*. The reinforcement 3 is closer to the exterior of the automobile than the inner panel 1*a*.

In the present embodiment, illustrated in FIG. 4 and FIG. 7, the protrusion 80 is inserted into a middle space 140 and is piled on the inner-cabin side surface of the front part/lower end protrusion 3*b*. The middle space 140 is between the inner panel 1*a* and the front part/lower end protrusion 3*b*. A dotted line in FIG. 4 illustrates the protrusion 80 before inserted into the middle space 140. The outer-cabin side surface of an end part of protrusion 80 is closer to the exterior of the automobile than a lower end of the front part/lower end protrusion 3*b* of the reinforcement 3, which extends in a front and rear direction.

The flange-forming part 3*a* of the reinforcement 3 and the front part/lower end protrusion 3*b* of the reinforcement 3 are unified on the upper side relative to the belt line 30 and form the reinforcement 3 illustrated in FIG. 10. Also, as illustrated in FIG. 7, the front part/lower end protrusion 3*b* is piled on the inner panel 1*a* on the lower side relative to the belt line 30. In FIG. 7, reference numeral 25 is reinforcement for a flange to which the belt line weather strip 20 couples.

With this configuration, as the protrusion 80 is inserted into the middle space 140 between the inner panel 1*a* and the front part/lower end protrusion 3*b*, the end part of protrusion 80 is subjected to a reaction force from the front part/lower end protrusion 3*b* of the reinforcement 3 in a direction 200 in FIG. 4 toward a front side and the interior of the automobile. The reaction force travels from the base root of the protrusion 80 to the outer-cabin side wall 51*b* through the oblique wall 64 such that the installation base member 51 as a whole is subjected to force in a direction 210 in FIG. 4 to rotate rearward and the exterior of the automobile. A protrusion 66 is integrally formed with the rear end of the outer-cabin side wall 51*b* by die molding. Since the protrusion 66 protrudes toward the interior of the automobile and presses the flange 42, the protrusion 66 together with the anchoring parts 56 hold the flange 42 more tightly.

In addition, the closure wall 70 is subjected to force in a direction 220 in FIG. 4 toward the rear side with a point of contact 150 between the base root of the protrusion 80 and the oblique wall 64 as a fulcrum. With this configuration, the closure wall 70 closely adheres to an end cap 21 on a front end of the belt line weather strip 20 and is prevented from rising or forming a space.

As illustrated in FIG. 10, the part of the touch sensor 50, which couples to the curve 1c of the flange 40, is formed by die molding with an insert 90, embedded in the part. The insert 90 is made of resin and has a substantially T shape. As illustrated in FIG. 4, the insert 90 includes a first insert 91 and a second insert 92. The first insert 91 has the shape of the plate, is made of resin, and is embedded in the oblique wall 64. The second insert 92 has a shape of a bar, is made of resin, and embedded in the protrusion 80. The second insert 92 extends rearward from a rear surface of the first insert 91 and is unified with the first insert 91. In FIG. 10, the touch sensor 50, the garnish 4, and the belt line weather strip 20 are omitted to emphasize a shape and a position of the insert 90.

In addition, a vertical wall 93, an upper wall 94, and a connection wall 95, illustrated in FIG. 9, are simultaneously formed during die molding to protect the insert 90 and prevent the protrusion 80 from breaking. The vertical wall 93 protrudes rearward from an outer-cabin side of the oblique wall 64 and extends in the upper and lower direction. The upper wall 94 is unified with an upper end of the vertical wall 93 and extends in an inner-cabin and outer-cabin direction. The connection wall 95 connects an outer-cabin side of the base root of the protrusion 80 and an inner-cabin side of the vertical wall 93.

A clip 110 is provided on a lower side relative to the vertical wall 93 to be fit into a hole 1d (FIG. 6) formed on the outer panel 1b.

In the present embodiment, the insert 90 is highly-hardened polypropylene with reinforcing materials including talc and glass fiber and is improved in rigidity and heat-resistance. With this configuration, the insert 90 is not degraded in rigidity during die molding and hardly deforms during heat-treatment. But, this should not be construed in a limiting sense.

On the part of the touch sensor 50, which couples to the curve 1c of the flange 40 on the front edge of the sliding door 1, the oblique wall 64 and the seal lip 65 are close to the interior of the automobile and fit the shape of the curve 1c. The curve 1c of the flange 40 is on the front end of the belt line 30. With this configuration, the touch sensor 50 systematically follows the curve 1c. In other words, the touch sensor 50 does not shift toward the exterior of the automobile, and the part of the touch sensor 50 on the belt line 30 does not approach the interior of the automobile.

Also, the closure wall 70 is formed on the oblique wall 64 and covers the large space 100 exposed on the front end of the belt line 30 from the front side of the automobile. This configuration does not degrade the appearance.

Figure 11:
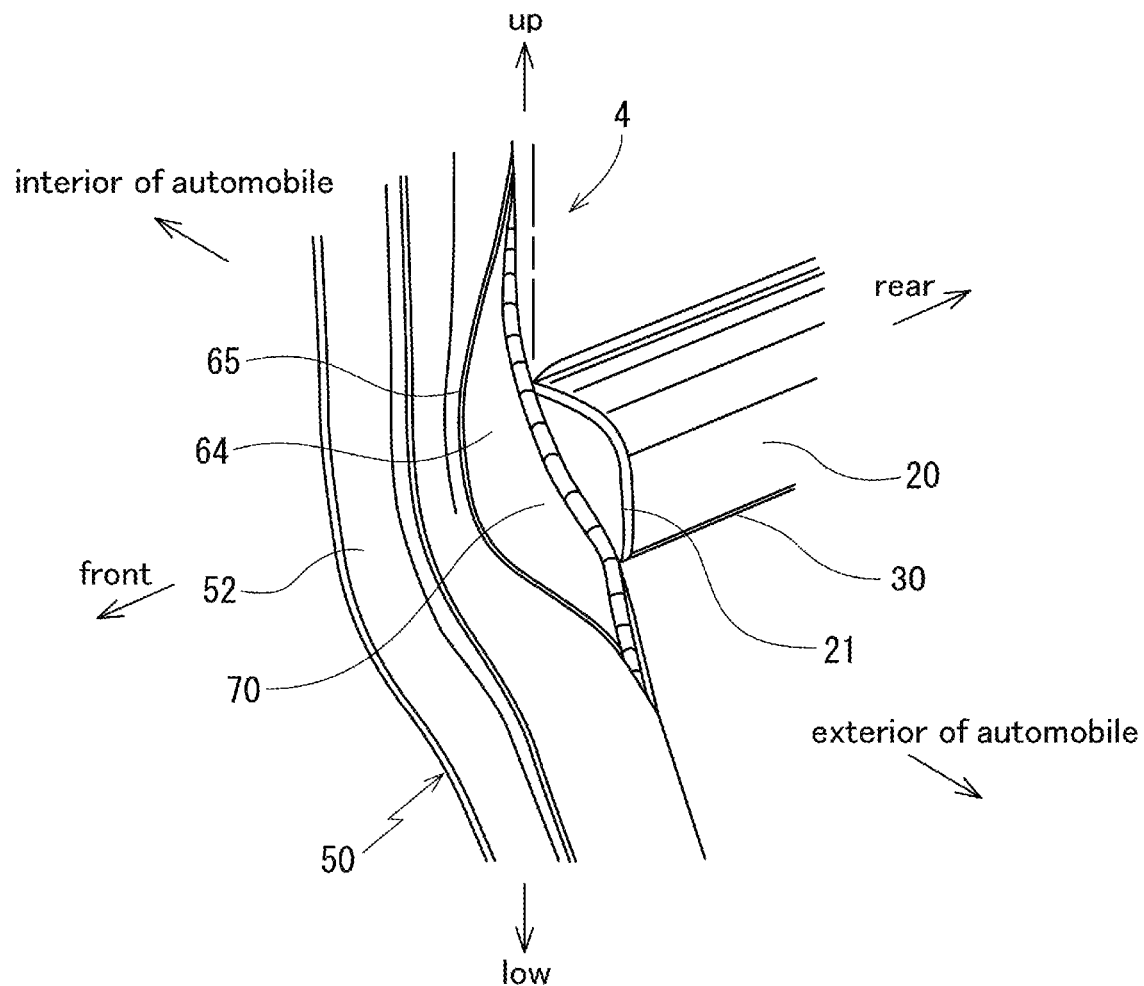
FIG. 11 is a perspective view of the touch sensor according to the embodiment of the invention with a closure wall closing a space.
Figure 12:
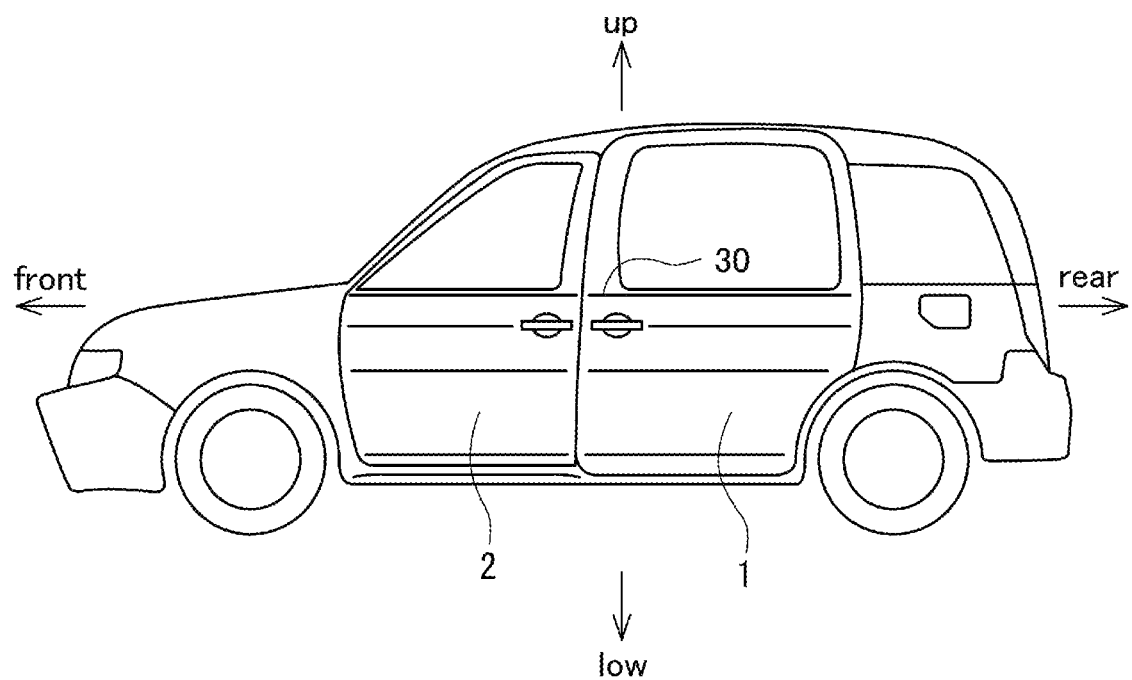
FIG. 12 is a side view of an automobile of which sliding door moves to open and close an opening.
Figure 13:
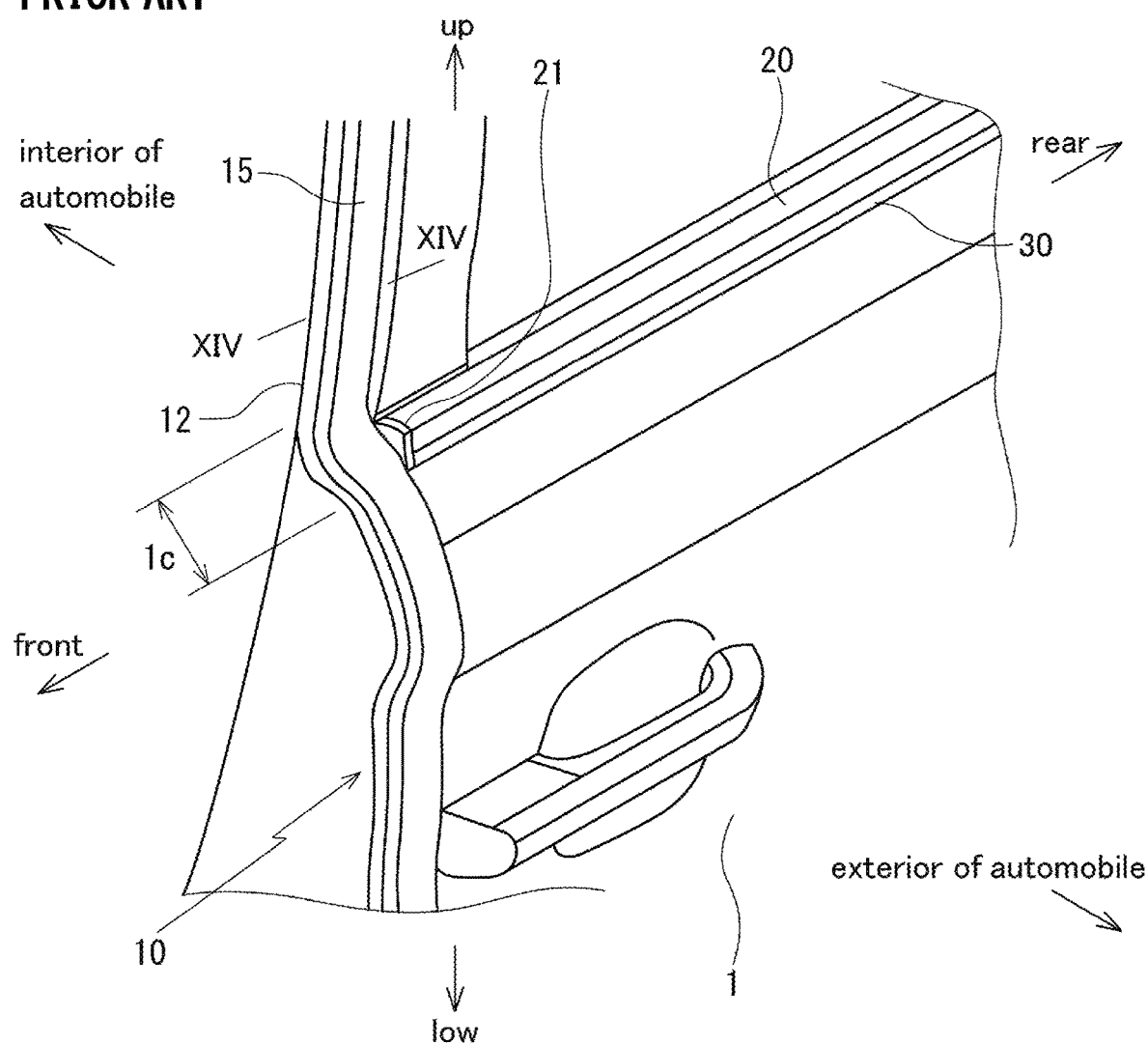
FIG. 13 is a perspective view of a touch sensor according to a prior art coupling to the sliding door.

In addition, the protrusion 80 extends rearward from the rear surface of the oblique wall 64. The protrusion 80 is piled on and makes contact with the inner-cabin side surface of the front part/lower end protrusion 3b of the reinforcement 3, and receives the reaction force from the front part/lower end protrusion 3b. The front part/lower end protrusion 3b is close to the exterior of the automobile than the inner panel 1a. The touch sensor 50 as the whole is subjected to the force from the base root of the protrusion 80 toward the exterior of the automobile. With this configuration, the part of the touch sensor 50 on the belt line 30 is not subjected to the force from the flange 42 to approach the interior of the automobile. In addition, since the closure wall 70 closely adheres to the large space 100 as illustrated in FIG. 4, the closure wall 70 is prevented from rising and forming the space between the end cap 21 and the closure wall 70 when the touch sensor 50 couples to the flange 40 as illustrated in FIG. 11.

In addition, the closure wall 70 and the oblique wall 64, on which the base root of the protrusion 80 is fixed, form the continuous surface which is visible. Accordingly, pressing force is directly transmitted to the protrusion 80 by, for example, fitting an operator's thumb on the front side of the oblique wall 64 with a forefinger and a middle finger on the rear side, and directly pressing the oblique wall 64 toward the rear side with the thumb, and therefore, the touch sensor 50 is easy to couple to the flange 40.

While in this embodiment, the rear end of the outer-cabin side wall 51b of the installation base member 51, the oblique wall 54, and the seal lip 55 of the touch sensor 50, formed by extrusion molding, are cut out prior to die molding, and the remaining parts of the touch sensor 50 are arranged on the die (not illustrated) along the curve 1c, this should not be construed in a limiting sense. Another possible embodiment is that only the oblique wall 54 and the seal lip 55 are cut out for substitution by the oblique wall 64 and the seal lip 65, which are formed by die molding.

Another possible embodiment is that the closure wall 70, formed by die molding, solely covers the large space 100 without forming the protrusion 80 by die molding (illustration omitted).

Another possible embodiment is that the touch sensor 50, formed by extrusion molding, only includes the oblique wall 54 without the seal lip 55 (illustration omitted).

Another possible embodiment is that a seal hollow part substitutes for the seal lip 55 of the touch sensor 50, formed by extrusion molding. The seal hollow part has a configuration that the front end of the seal lip 55 connects with a position of connecting between the outer-cabin side wall 51b and the connecting wall 51c (illustration omitted).

Another possible embodiment is that the protrusion 80 is the second insert 92, which has the shape of the bar, is exposed as illustrated in FIG. 7 and FIG. 10, and not covered with the die molding material, instead of the second insert 92, which has the shape of the bar and is embedded in the die-molding material as illustrated in FIG. 4.

Another possible embodiment is that the second insert 92, which has the shape of the bar, has a quadrangle-shaped cross section instead of a triangular-shaped cross section as illustrated in FIG. 7.

Another possible embodiment is that the upper wall 94 only includes die-molding material without the insert made of resin embedded in the upper wall 94.

While in the present embodiment, the touch sensor 50 detects the object such as the part of human bodies (fingers, hands or legs) between the sliding door 1 and the rear end of the front door 2 as the opening of the automobile body, this should not be construed in a limiting sense. Another possible embodiment is that the touch sensor 50 detects the object between the sliding door 1 and the circumferential edge of the body panel 5 as the opening of the automobile body, not the front door 2.

We claim:

1. A coupling structure including a touch sensor, the coupling structure comprising:
   a sliding door which moves between at least two positions to open and close an opening of an automobile body, the sliding door having a space among a lower end of a belt line weather strip, an inner panel, and an outer panel, the space being exposed on a front end of a belt line, and the belt line weather strip being configured to operably couple to the belt line;
   a flange on a front edge of the sliding door, the flange extending in an upper-lower direction of the automobile body and having a curve on the belt line, and the curve extending in the upper-lower direction and having a convex shape toward an interior of the automobile; and the touch sensor, the touch sensor being configured to operably couple to the flange, and the touch sensor including:

an installation base member having a substantially U-shaped cross section including an inner-cabin side wall, an outer-cabin side wall, and a connecting wall, the connecting wall connecting the side walls, the installation base member having a plurality of anchoring parts formed on an inner side thereof, and the anchoring parts extending toward the inner side;

a hollow part unified with the connecting wall, the hollow part being configured to make elastic contact with an object disposed between the sliding door and the opening of the automobile body;

a sensor fixed in the hollow part, the sensor being configured to output a corresponding electric signal when the object makes contact with the hollow part; and an oblique wall which extends toward an exterior of the automobile and slopes rearward from a rear end of the outer-cabin side wall, wherein a part of the touch sensor which is configured to operably couple to the curve of the flange comprises:

the oblique wall close to the interior of the automobile, the oblique wall being configured to fit a shape of the curve; and a closure wall which extends toward the exterior of the automobile and forms a continuous surface with the oblique wall, the closure wall being configured to cover the space from a front side of the automobile.

2. The coupling structure as claimed in claim 1, wherein:
the touch sensor comprises a seal lip which extends toward an interior of the automobile and slopes frontward from a rear end of the oblique wall, the seal lip being configured to face and make elastic contact with a circumferential edge of the opening of the automobile body when the sliding door is in a closed position; and the part of the touch sensor which is configured to operably couple to the curve of the flange comprises the seal lip close to the interior of the automobile, the seal lip being configured to fit the shape of the curve.

3. The coupling structure as claimed in claim 2, wherein on the part of the touch sensor which is configured to operably couple to the curve of the flange, a base root of the seal lip relative to the oblique wall gradually approaches the outer-cabin side wall from the rear end of the oblique wall in a range from an upper part of the curve to an apex thereof, and the base root of the seal lip gradually approaches the rear end of the oblique wall from the outer-cabin side wall in a range from the apex of the curve to a lower part thereof.

4. The coupling structure as claimed in claim 1, wherein the part of the touch sensor which is configured to operably couple to the curve of the flange comprises a protrusion extending rearward from a rear surface of the oblique wall, the protrusion being configured to make contact with an inner-cabin side surface of reinforcement and receive a reaction force from the reinforcement, and the reinforcement being closer to the exterior of the automobile than the inner panel.

5. The coupling structure as claimed in claim 1, wherein the oblique wall on the part of the touch sensor which is configured to operably couple to the curve of the flange has a first insert embedded therein, the first insert having a plate shape and being made of resin.

6. The coupling structure as claimed in claim 4, wherein:
the oblique wall on the part of the touch sensor which is configured to operably couple to the curve of the flange has a first insert embedded therein, the first insert having a plate shape and being made of resin; and the protrusion on the part of the touch sensor which is configured to operably couple to the curve of the flange has a second insert embedded therein, the second insert having a bar shape and being made of resin, and the second insert extending rearward from a rear surface of the first insert and being unified with the first insert.

7. The coupling structure as claimed in claim 2, wherein the part of the touch sensor which is configured to operably couple to the curve of the flange comprises:
the oblique wall, the seal lip, and the closure wall, which are formed by die molding; and members other than the oblique wall, the seal lip, and the closure wall, which are formed by extrusion molding.

8. The coupling structure as claimed in claim 2, wherein the part of the touch sensor which is configured to operably couple to the curve of the flange comprises:
a rear end of the outer-cabin side wall, the oblique wall, the seal lip, and the closure wall, which are formed by die molding; and members other than the rear end of the outer-cabin side wall, the oblique wall, the seal lip, and the closure wall, which are formed by extrusion molding.

9. The coupling structure as claimed in claim 4, wherein the protrusion is formed by die molding.

* * * * *